United States Patent [19]

Nakahara et al.

[11] Patent Number: 4,742,705
[45] Date of Patent: May 10, 1988

[54] METHOD AND APPARATUS FOR FORMING SINUOUS LEAD WIRE

[75] Inventors: Kunikazu Nakahara, Kyoto; Kenichi Watanabe, Ootsu, both of Japan

[73] Assignee: Murata Manufacturing Co., Ltd., Japan

[21] Appl. No.: 685,399

[22] Filed: Dec. 24, 1984

[30] Foreign Application Priority Data

Dec. 29, 1983 [JP] Japan .................. 58-248139

[51] Int. Cl.⁴ ............................................. B21F 01/04
[52] U.S. Cl. ......................................... 72/187; 72/191
[58] Field of Search ......................... 72/187, 190, 191; 140/71 R, 91, 105

[56] References Cited

U.S. PATENT DOCUMENTS

| 2,169,420 | 8/1939 | Jacobs | 140/105 |
| 3,064,694 | 11/1962 | Brook et al. | 72/190 |
| 3,561,500 | 2/1971 | Rentz et al. | 140/105 |
| 4,444,227 | 4/1984 | Gott et al. | 140/105 |

FOREIGN PATENT DOCUMENTS

| 584575 | 1/1947 | United Kingdom . |
| 649826 | 2/1948 | United Kingdom . |
| 662421 | 12/1949 | United Kingdom . |
| 1230038 | 11/1969 | United Kingdom . |
| 1282199 | 4/1970 | United Kingdom . |
| 1511790 | 10/1976 | United Kingdom . |

Primary Examiner—Lowell A. Larson
Attorney, Agent, or Firm—Ostrolenk, Faber, Gerb & Soffen

[57] ABSTRACT

There are disclosed a method and apparatus for forming a sinuous lead wire (30) used for efficiently obtaining U-shaped lead wires (5) which serve as a lead wire material for a ceramic capacitor (1) having two terminal lead wires (3, 4). For forming such sinuous lead wire, first and second pin series (23, 24, 70, 71) are used which comprise respective pluralities of pins (21, 22, 63, 64) arranged with an equal pitch and which are arranged in two rows shifted by a half pitch from each other. Each pin series is moved in such a manner that each pin in one series enters between two adjacent pins in the other series. As a result of such pin movement, a material lead wire disposed between the first and second pin series is sinuously deformed.

13 Claims, 13 Drawing Sheets

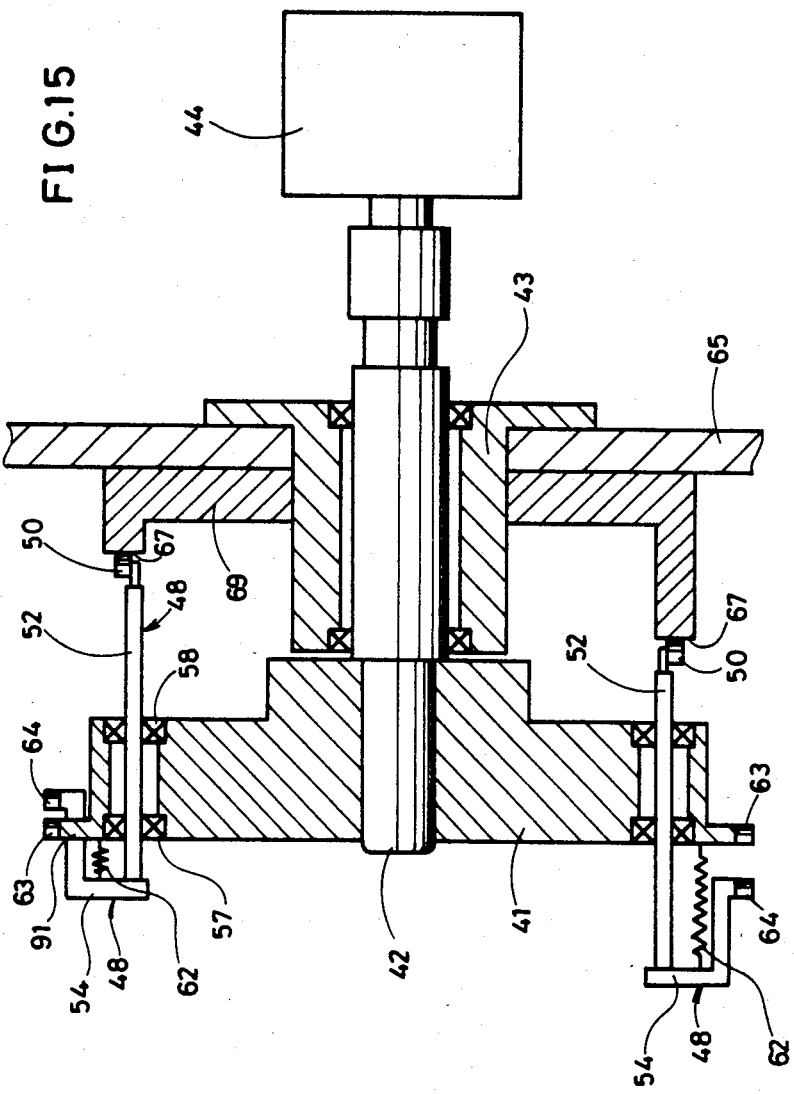

METHOD AND APPARATUS FOR FORMING SINUOUS LEAD WIRE

BACKGROUND OF THE INVENTION

This invention relates to a method and apparatus for forming a sinuous lead wire used for obtaining U-shaped lead wires employed in the process of producing various electronic parts such as ceramic capacitors.

FIG. 1 shows a sequence of steps for obtaining an electronic part such as a ceramic capacitor, with attention paid to the lead wires. To give a description with a ceramic capacitor taken as an example, a ceramic capacitor 1 shown at the final stage in FIG. 1 comprises a capacitor body 2, and two lead wires 3 and 4. The lead wires 3 and 4 are soldered to electrodes formed on the main surfaces of the ceramic body 2, thus forming the terminals of such ceramic capacitor 1.

The operation of obtaining such lead wires 3 and 4 involves the following steps. In the first step, a linear material lead wire 5 is prepared. The material lead wire 5 is, e.g., a soldered copper wire or iron wire. In the second step, the linear material lead wire 5 is bent into U shape. In the third step, the opposite ends of the U-shaped material lead wire 5 are bent to cross each other. In the fourth step, the capacitor body 2 is held between the cross portions of the opposite ends of the material lead wire 5 and soldering is applied thereto. In the fifth step, the material lead wire 5 is cut along a cutting line 6 to provide two separate lead wires 3 and 4.

This invention is advantageously applied to the step of bending the linear material lead wire into U shape, among the steps shown in FIG. 1.

Heretofore, to obtain the U-shaped lead wire 5 shown in FIG. 1, the following method has been performed. For example as shown in FIG. 2, a material lead wire 7 cut to a predetermined length is placed on a mold 8 and is then pressed into the mold 8 by a press pin 9 having a U-shaped front end, whereby the material lead wire 7 is deformed into U shape. Alternatively, as shown in FIG. 3, a predetermined length of material lead wire 11 is placed on a round pin 10 and a mold 12 is lowered to receive the round pin 10 therein, whereby a material lead wire 11 which is deformed into U shape is obtained.

With such conventional methods, however, it is necessary to reciprocate the press pin 9 or mold 12 and the stroke required has to be greater than the length L of the U-shaped lead wire 5 shown in FIG. 1, thus imposing limits on the formation speed. Another problem is that unless the lead wires 7 and 11 are sufficiently stretched in advance, the length L and width W of the resulting U-shaped lead wire 5 shown in FIG. 1 are not accurate. Further, with the aforesaid forming means, even if the lead wire is sufficiently stretched in advance, the spring-back makes it difficult for the width W of the U-shaped lead wire 5 to take a predetermined value.

SUMMARY OF THE INVENTION

According to this invention, there are provided a method and apparatus for forming a sinuous lead wire, such formation being performed as a preliminary stage for obtaining U-shaped lead wires.

Accordingly, an object of this invention is to provide a method and apparatus for forming a sinuous lead wire, which make it possible to form U-shaped lead wires at high speed and to increase dimensional accuracy thereof with ease.

In brief, this invention is a method of forming a sinuous lead wire, comprising the steps of arranging respective pluralities of first and second pins with an equal pitch to define first and second pin series which are shifted by a half pitch from each other, arranging a material lead wire between the first and second pin series and along the direction in which the pin series extend, and relatively moving the first and second pins in a direction substantially at right angles to the direction in which the pin series extend, in such a manner that each first pin enters between corresponding second pins, thereby sinuously forming the material lead wire.

According to the invention, since a sinuous lead wire from which a plurality of U-shaped lead wires can be obtained can be efficiently produced, it is possible to produce U-shaped lead wires at high speed. Further, when the first and second pins are relatively moved to sinuously form the material lead wire, the latter is given a tension exceeding its elastic limit and can be thereby plastically deformed, so that the spring-back phenomenon is suppressed and U-shaped wires of high precision are obtained.

In a preferred embodiment of the invention, the first and second pin series are moved in the direction in which they extend, and with this movement the first and second pins progressively enter between corresponding pins. Thereby, successive portions of the material lead wire from its end are given a U shape, and the material lead wire is ultimately prevented from being locally excessively plastically deformed.

According to another embodiment of the invention, there is provided an apparatus for forming a sinuous lead wire. This forming apparatus comprises a first pin series having a plurality of first pins arranged with an equal pitch, a second pin series having a plurality of second pins arranged with the same pitch as that of the first pins to form a row extending along the first pin series, said second pin series being shifted by a half pitch from said first pin series, and pin drive means which, with a material lead wire disposed between the first and second pin series to extend in the direction in which the pin series extend, drives the first and second pins to relatively move them in a direction substantially at right angles to the direction in which the pin series extend, in such a manner that each first pin enters between corresponding second pins.

In a preferred embodiment of said apparatus for forming a sinuous lead wire, in order that successive U-shaped portions may be formed during the feeding of a material lead wire, the first and second pin series are arranged in two rows circumferentially on the outer periphery of a rotary body driven for rotation and the pins included in at least one of the first and second pin series are movable independently of each other so that each pin in one pin series enters between mating pins in the other pin series. To effect the relative movement of the first and second pins so as to sinuously form the material lead wire, use is made of a cam device comprising cam means and follower means. Thereby, the first and second pins being circumferentially moved with the rotation of the rotary body move in such a manner as to gradually sinuously deform the material lead wire.

In a further embodiment of the invention, the step of forming a sinuous lead wire is divided into two stages, wherein in the first stage relatively mild plastic deformation is imparted to the material lead wire and in the second stage a sinuous lead wire having the ultimately required geometrical configuration is obtained.

BRIEF DESCRIPTION OF THE DRAWINGS

FIG. 15 is a longitudinal section showing principal portions of a forming apparatus according to a further embodiment of the invention;

DESCRIPTION OF THE PREFERRED EMBODIMENTS

Figure 4:
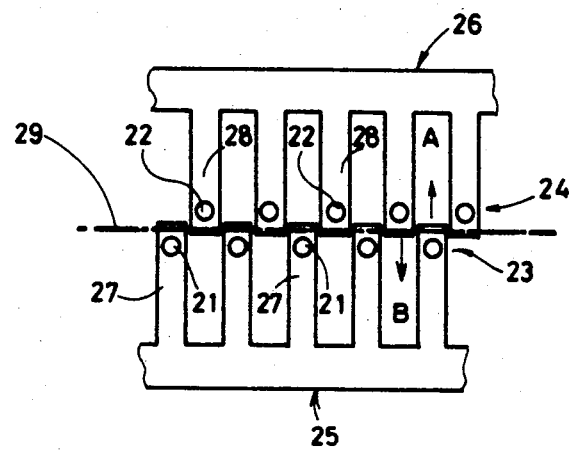
FIGS. 4 and 5 are schematic views of a process shown in order for explaining an embodiment of the invention.
Figure 5:
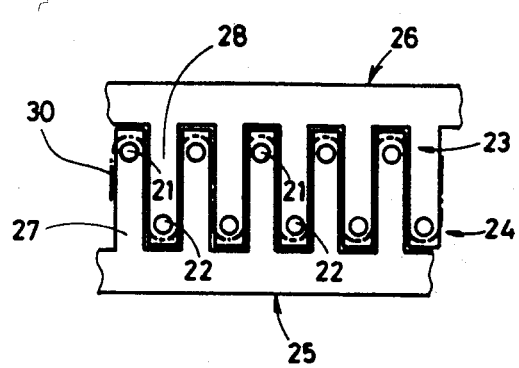

Referring to FIGS. 4 and 5, a plurality of first pins 21 and a plurality of second pins 22 form a first pin series 23 and a second pin series 24, respectively. These first and second pins 21 and 22 are attached to the comb tooth portions 27 and 28 of first and second support bodies 25 and 26, respectively. The comb tooth portions 27 and 28 of the first and second support bodies 25 and 26 are disposed so that each tooth portion in one support body enters between adjacent tooth portions in the other, and they are arranged with the same distance. Therefore, the first and second pins 21 and 22 included in the first and second pin series 23 and 24, respectively, are arranged with an equal pitch and shifted by a half pitch from each other.

The first and second support bodies 25 and 26 are movable from the state of FIG. 4 to the state of FIG. 5 by drive means such as pushers (not shown). In the state of FIG. 5, the first and second pins 21 and 22 have been moved until each enters between mating pins.

To obtain a sinuous lead wire, a material lead wire 29 shown in a dash-dot line in FIG. 4 is placed between the first and second pin series 23 and 24. The first and second support bodies 25 and 26 are moved in the directions of arrows A and B, respectively, until the state of FIG. 5 is established. At this time, the first and second pins 21 and 22 each enter between corresponding pins and the material lead wire 29 has its lengthwise distributed portions pulled in opposite directions by the first and second pins 21 and 22, whereby the material lead wire is sinuously deformed as schematically shown in a dash-dot line in FIG. 5; thus, a sinuous lead wire 30 is obtained. At this time, the material lead wire 29 is stretched beyond its elastic limit, whereby its deformation due to spring-back and the like after its formation can be prevented.

In addition, the movements of the support bodies 25 and 26 moved to cause the first and second pins 21 and 22 to enter between mating pins are relative. Thus, only one of the support bodies 25 and 26 may be moved or both support bodies may be moved. In cases where both support bodies 25 and 26 are moved, since their respective strokes may be short, the formation time will be reduced.

In the apparatus shown in FIGS. 4 and 5, the number of first and second pins 21 and 22 attached to the first and second support bodies 25 and 26, respectively, is arbitrary, but its upper limit is dependent on the diameter of the material lead wire and the tension imposed on the material lead wire during formation.

Figure 6:
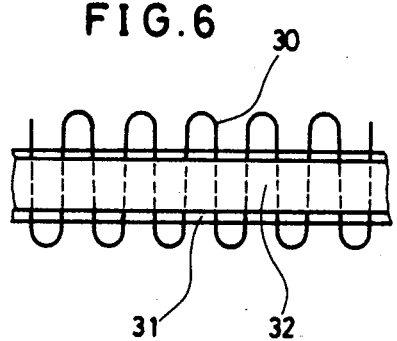
FIG. 6 shows a sinuous lead wire as it is taped.
Figure 7:
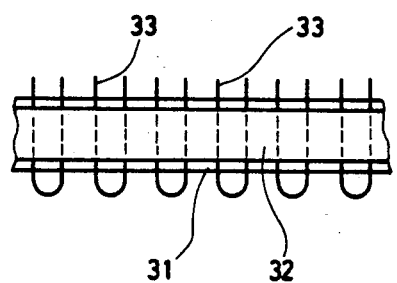
FIG. 7 shows the taped sinuous lead wire of FIG. 6 divided into a plurality of portions to provide U-shaped lead wires.

The sinuous lead wire 30 formed as shown in FIG. 5 is then fixed on a holder 31 such as a strip of thick paper as by an adhesive tape 32, as shown in FIG. 6. And the sinuous lead wire 30 is then cut at its bent portions on one side, as shown in FIG. 7, whereby it is divided into a plurality of U-shaped lead wires 33.

Figure 8:
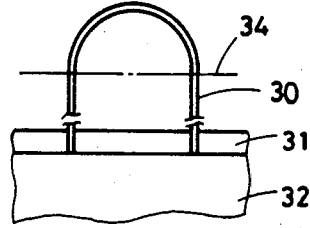
FIG. 8 shows a first example of a cutting method for cutting a sinuous lead wire into a plurality of U-shaped lead wires.
Figure 9:
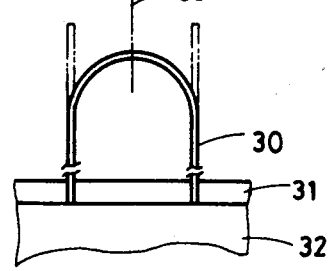
FIG. 9 shows a second example of a cutting method for cutting a sinuous lead wire into a plurality of U-shaped lead wires.

There are two cutting methods for dividing the sinuous lead wire 30 into a plurality of U-shaped lead wires 33, one method being shown in FIG. 8 and the other in FIG. 9. In FIG. 8, the bent portions on one side of the sinuous lead wire 30 are cut along a cutting line 34, whereby the sinuous lead wire is divided into a plurality of U-shaped lead wires 33 as shown in FIG. 7. In FIG. 9, each the bent portion on one side of the sinuous lead wire 30 is cut at its middle along a cutting line 35, and then the halves of each cut bent portion are straightened, as shown in phantom lines, to provide a U-shaped lead wire. Of these two methods, the latter is more preferable from the standpoint of the saving of material.

Some examples of more practical forming apparatuses capable of continuously forming a sinuous lead wire will now be described.

Figure 10:
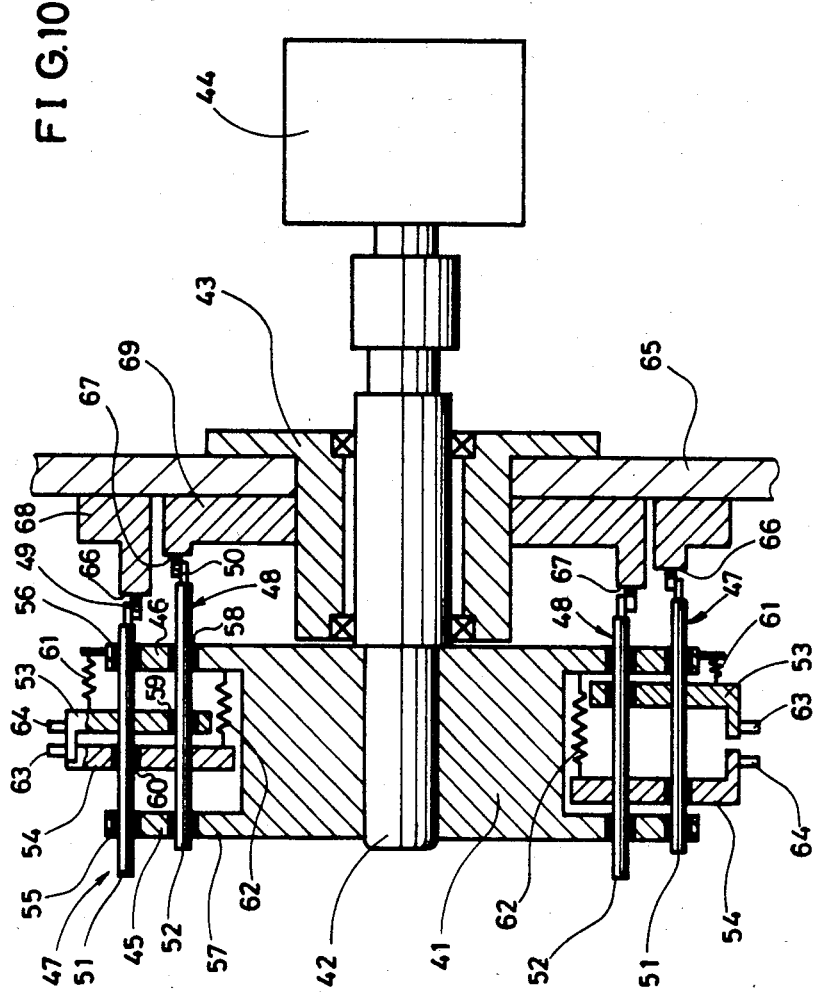
FIG. 10 is a longitudinal section showing principal portions of a forming apparatus according to an embodiment of the invention.

FIG. 10 shows an embodiment of such forming apparatus. This forming apparatus has a rotary body 41. A drive shaft 42 is fixed in the central portion of the rotary body 41 and is rotatably supported in a bearing 43. A rotation drive source 44, such as an electric motor, is connected to the drive shaft 42, whereby the rotary body 41 is rotated around the axis of the drive shaft 42.

Two flanges 45 and 46 extend from the peripheral surface of the rotary body 41 throughout its circumference. Supported across these two flanges 45 and 46 are respective pluralities of first and second cam followers 47 and 48. The first and second cam followers 47 and 48 comprise rollers 49, 50, support shafts 51, 52 having said rollers 49, 50 attached to their ends, and support blocks 53, 54 fixed to said support shafts 51, 52, respectively. The support shafts 51 and 52 are supported in the two flanges 45 and 46 through, e.g., slide bearings 55, 56, 57 and 58, and the cam followers 47 and 48 are movable in a direction parallel to the drive shaft 42. A support block 53 forming a portion of each first cam follower 47 receives the support shaft 52 of the second cam follower 48 through, e.g., a slide bearing 59. Further, a support block 54 included in each second cam follower 48 receives the support shaft 51 of the first cam follower 47 through, e.g., a slide bearing 60. As a result of such arrangement, the first and second cam followers 47 and 48 are movable independently of each other axially of the support shafts 51 and 52, respectively, while they are prevented from rotating around the axes of the support shafts 51 and 52, whereby the attitudes of the rollers 49 and 50 and support blocks 53 and 54 are maintained.

Springs 61 and 62 are connected between the support blocks 53, 54 and the flange 46, whereby the first and second cam followers 47 and 48 are constantly urged to the right as viewed in FIG. 10. Coiled tension springs are used as the springs 61 and 62, but other forms of spring may be used by changing the manner of attachment.

Each support block 53 has a first pin 63 attached thereto, while each support block 54 has a second pin 64 attached thereto. In addition, in FIG. 10, the first and second cam followers 47 and 48 are shown, only two each; actually, however, these cam followers 47 and 48, each in plurality, are respectively arranged with an equal pitch around the outer periphery of the rotary body 41. Therefore, the first and second pins 63 and 64 are respectively arranged with an equal pitch around the outer periphery of the rotary body 41 and form the first and second pin series. In addition, the first and second pins 63 and 64 are equidistant from the drive shaft 42, but with respect to the circumferential direction of the rotary body 41, the first pins 63 are shifted by a half pitch from the second pins 64.

The aforesaid bearing 43 is held in a fixed wall 65. Fixed on the fixed wall 65 are cams 68 and 69 having cam surfaces 66 and 67, respectively, opposed to an end surface of the rotary body 41. These cams 68 and 69 are, e.g., cylindrical cams. The first cam 68 is associated with the first cam followers 47 and the second cam 69 with the second cam followers 48. The rollers 49 included in the first cam followers 47 roll on the surface 66 of the first cam 68. The rollers 50 included in the second cam followers 48 roll on the cam surface 67 of the second cam 69. In FIG. 10, only the sectioned end surfaces of the cams 68 and 69 are shown, the contours of the cam surfaces 66 and 67 not being shown in detail; to give an outline thereof, the cam surface 66 of the first cam 68 is so formed that it is highest at its upper portion as viewed in FIG. 10 and becomes lower as its bottom portion is reached, while the cam surface 67 of the second cam 69 is so formed that its inclination is reverse to that of the cam surface 66 of the first cam 68. In addition, the contours of these cam surfaces 66 and 67 are designed to enable the first and second pins 63 and 64 to move as described below.

Figure 11:
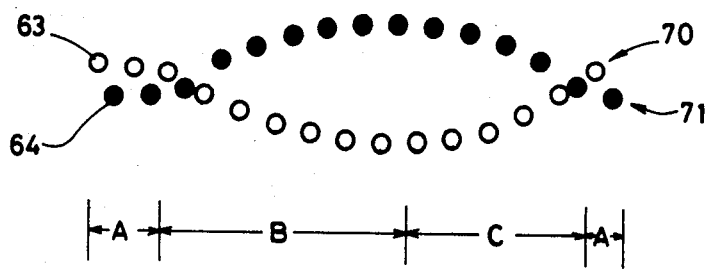
FIG. 11 is a developed view showing the arrangement of the pins of the forming apparatus of FIG. 10.

FIG. 11 is a developed view showing the arrangement of the first and second pins 63 and 64 installed in the apparatus of FIG. 10. In FIG. 11, the first and second pins 63 and 64 are indicated by white and black circles, respectively. The first and second pins 63 and 64, each in plurality, are arranged with an equal pitch to form the first and second pin series 70 and 71, respectively.

Referring to FIG. 11, in the region A the first and second pin series 70 and 71 lie substantially linearly in two rows; in the region B the first and second pins 63 and 64 included in the first and second pin series 70 and 71 each enter between corresponding pins in the mating pin series and then gradually leave them, in the terminal portion of the region B the distance between the first and second pin series 70 and 71 being at its maximum. In the region C, the distance between the first and second pin series 70 and 71 becomes gradually smaller and in its terminal portion the first and second pins 63 and 64 each come out from between corresponding pins in the mating pin series and enter the region A. The contours of the cam surfaces 66 and 67 of the cams are designed so that the aforesaid movement of the first and second pin series 70 and 71 from the region A back to the region A occurs once for each revolution of the rotary body 41.

Figure 12:
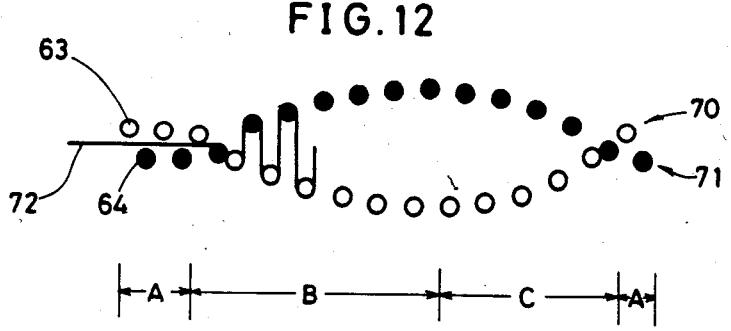
FIGS. 12 and 13 are developed views showing the arrangement of pins in a manner similar to FIG. 11, showing how a material lead wire is sinuously formed by the forming apparatus of FIG. 10.
Figure 13:
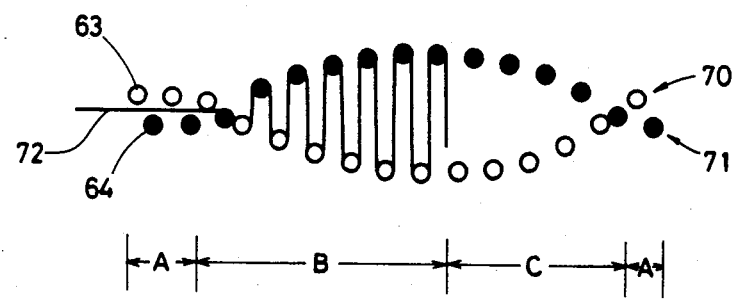

FIGS. 12 and 13 are developed views similar to FIG. 11, showing how the material lead wire 72 is sinuously formed.

As shown in FIG. 12, the front end of the material lead wire 72 withdrawn from a supply reel or the like (not shown) is passed between the first and second pin series 70 and 71 and then it is entrained around the pins 63 and 64 positioned in the initial end of the region B to assume a sinuous form. In this state, when the rotary body 41 is rotated, the first and second pins 63 and 64 disposed, e.g., in the region A progressively change their disposition to assume the state of arrangement shown in the regions B and C. As a result, the material lead wire 72, which was linear in the region A, together with the first and second pins 63 and 64, enters between corresponding pins in the mating pin series. Thus, the material lead wire 72 is shaped into a sinuous form having a predetermined width, in the terminal portion of the region B, as shown in FIG. 13. If the sinuous lead wire thus formed is taken out of the terminal portion of the region B, then a continuous lead wire can be taken out so long as the material lead wire 72 is continuous.

In this case, if the material lead wire 72 is stretched beyond its elastic limit and thereby plastically deformed in the terminal portion of the region B, its deformation due to spring-back after formation can be prevented and its dimensional accuracy can be increased irrespective of the degree of prior stretch of the material lead wire 72.

The sinuous lead wire thus obtained is divided into a plurality of U-shaped lead wires by the method as described in FIGS. 6 and 7.

Figure 14:
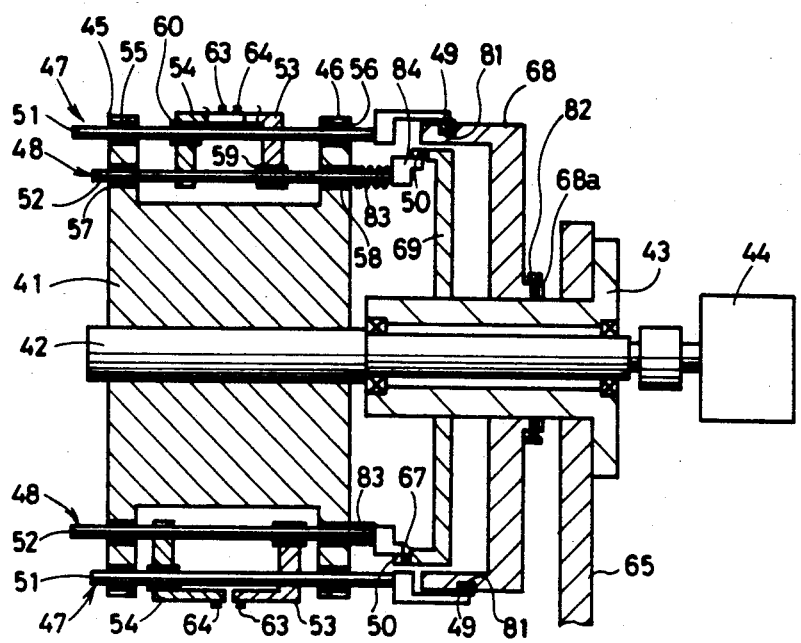
FIG. 14 is a longitudinal section showing principal portions of a forming apparatus according to another embodiment of the invention.

FIG. 14 shows another embodiment of a forming apparatus based on substantially the same principle as that for the apparatus shown in FIG. 10. To avoid the repetition of the same description, in FIG. 14 the portions corresponding to those shown in FIG. 10 are marked with like reference numerals. The characteristic portions of the apparatus shown in FIG. 14 will now be described in comparison with the apparatus shown in FIG. 10.

With attention paid to the relation between the first cam follower 47 and the first cam 68 of the apparatus of FIG. 14, it is seen that the rollers 49 are received in a groove formed in the outer peripheral surface of the first cam 68. That is, the first cam 68 is a grooved cam, whereby the transmission of movement from the cam 68 to the cam followers 47 is reliably effected. Thus, the members corresponding to the springs 61 used in FIG. 10 can be dispensed with.

Further, the first cam 68 is constructed so that its position can be adjusted axially of the bearing 43. To this end, a plurality of set screws 82 are radially installed in a cylindrical portion 68a formed at one end of the cam 68. By loosening these set screws 82, the cam 68 becomes movable in the direction in which the drive shaft 42 extends, and by tightening the set screws 82, the cam 68 is fixed with respect to the bearing 43. Such arrangement which enables positional adjustment of the first cam 68 serves to adjust the widthwise dimension of the sinuous lead wire to be obtained and hence makes it possible to adjust the dimension L of the U-shaped lead wire 5 of FIG. 1. In addition, the same arrangement for positional adjustment may be applied to the second cam 69.

With attention paid to the second cam follower 48, it is seen that instead of the tension spring 62 used in FIG. 10, a compression spring 83 is positioned on the support shaft 52 and between the flange 46 and a connector block 84. These compression springs 83 perform the same function as that of the tension springs 62, urging the second cam followers 48 to the right as viewed in the figure.

The apparatus of FIG. 14 somewhat differs from the apparatus of FIG. 10 in a dimensional aspect, but except for said point it is substantially the same as the apparatus of FIG. 10.

The apparatus of FIG. 10 and the apparatus of FIG. 14 are constructed so that both the first and second pins 63 and 64 are movable in a direction substantially at right angles to the direction in which the first and second pin series 70 and 71 extend. However, it may be so arranged that either the first or the second pins are movable in a direction substantially at right angles to the direction in which the pin series extend. FIG. 15 shows such an embodiment.

In describing the forming apparatus shown in FIG. 15 in comparison with the apparatus of FIG. 10, the repetition of the same description is avoided by designating the portions in FIG. 15 corresponding to those shown in FIG. 10 by the same reference numerals as used in FIG. 10.

Referring to FIG. 15, the first pins 63 are attached to a support block 91 integrally extending from the rotary body 41. On the other hand, the second pins 64 are held by the cam followers 48 in substantially the same manner as that for the second pins 64 shown in FIG. 10. The cam followers 48 are acted upon by a cam 69 which is substantially the same as the second cam 69 of FIG. 10. Further, the support shafts 52 are non-circular in cross-section and serve to maintain the attitude of the cam followers 48. In the apparatus of FIG. 15, the first cam 68, first cam followers 47 and springs 61 shown in FIG. 10 are not provided. The rest of the arrangement is substantially the same as in the apparatus shown in FIG. 10.

Figure 16:
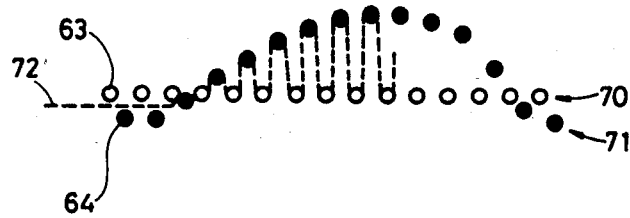
FIG. 16 is a developed view showing the arrangement of the pins of the forming apparatus of FIG. 15 and also showing the manner in which the material lead wire is sinuously formed.

The disposition of the first and second pins 63 and 64 provided in the forming apparatus of FIG. 15 is shown in a developed view in FIG. 16. In FIG. 16, the first and second pins 63 and 64 are indicated by white and black circles, respectively. The first pins 63 constitute the first pin series 70 which extends linearly. The second pins 64 constitute the second pin series 71 which forms a curve crossing the first pin series 70.

With the rotation of the rotary body 41, the first pins 63 move in a linear path, while the second pins 64 move in a curved path. However, when the relative movement between the first and second pins 63 and 64 is taken into account, it is seen that the first and second pins 63 and 64 move in such a manner that each enters between corresponding pins in the mating pin series, as in FIG. 10. Therefore, as shown in a dotted line in FIG. 16, the material lead wire 72 is sinuously formed as the rotary body rotates.

A forming apparatus to be described with reference to FIGS. 17 through 32 is an improvement over the forming apparatus shown in FIG. 14. This forming apparatus is characterized in that the step of forming a material lead wire until a desired sinuous lead wire is obtained from a linear material lead wire is divided into two stages. That is, in the first stage of formation, the material lead wire is shaped into a mild sinuous form and in the second stage the intended sinuous lead wire is obtained. Such two-stage forming step brings about the following advantages.

Figure 1:
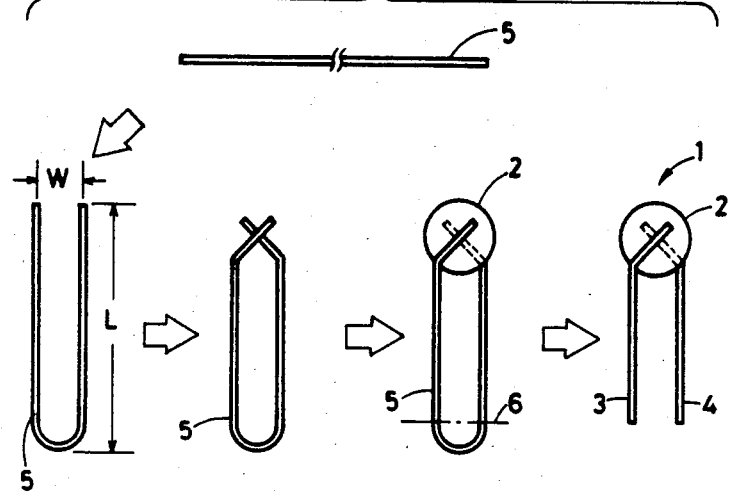
FIG. 1 is a view showing a sequence of steps involved in producing a ceramic capacitor which is an example of an electronic part for which a sinuous lead wire obtained by the invention can be used, with attention paid to the lead wires.
Figure 2:
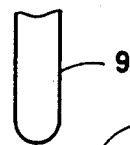
FIG. 2 shows a first conventional example of a process performed to obtain a U-shaped lead wire.
Figure 3:
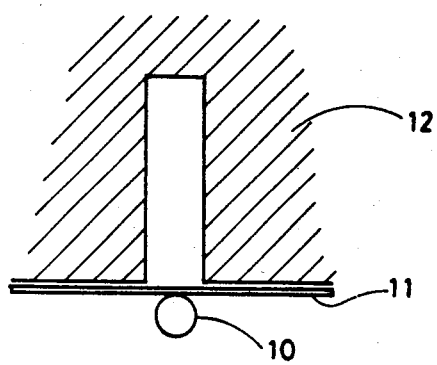
FIG. 3 shows a second conventional example of a process performed to obtain a U-shaped lead wire.

First, as compared with the single-stage forming step, the use of the two-stage forming step lessens the phenomenon in which the material lead wire is locally subjected to an excessive force which causes the diameter of the resulting sinuous lead wire to vary locally. Particularly, depending upon the size of an electronic part to which lead wires are to be attached, lead wires whose width W in FIG. 1 is very small will be required. In such case of forming a sinuous lead wire for obtaining U-shaped lead wires with a small width W, said phenomenon takes place remarkably and hence the two-stage forming step becomes advantageous.

Further, in the case of producing a sinuous lead wire at high speed, there is problem that the pressure angles of the cams 68 and 69 shown, e.g., in FIG. 1 cannot be made so large. In this case, too, particularly where it is desired to obtain a sinuous lead wire from which U-shaped lead wires having a small width W and a large length L are obtained, the problem becomes more serious. Thus, if the two-stage forming step is employed, even when the pressure angles of the cams used in each stage are not made so large, a sinuous lead wire whose width W is small and whose length L is large can eventually be obtained and hence a high speed operation is possible.

Figure 17:
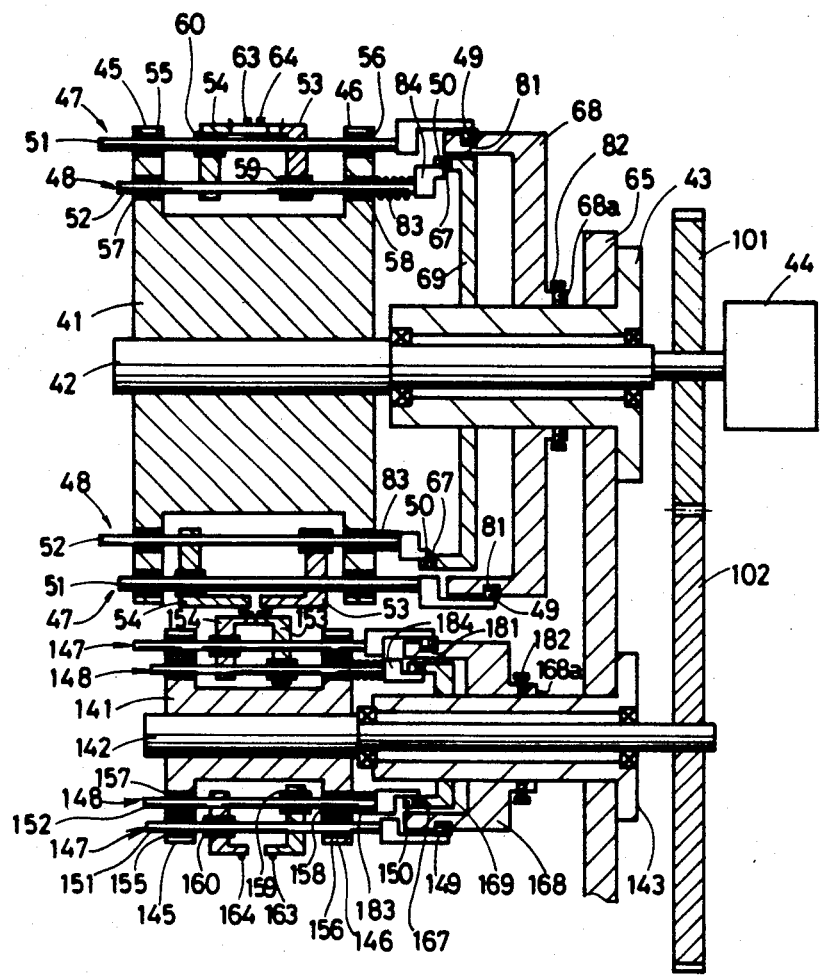
FIG. 17 is a longitudinal section showing principal portions of a forming apparatus according to a further embodiment of the invention.
Figure 18:
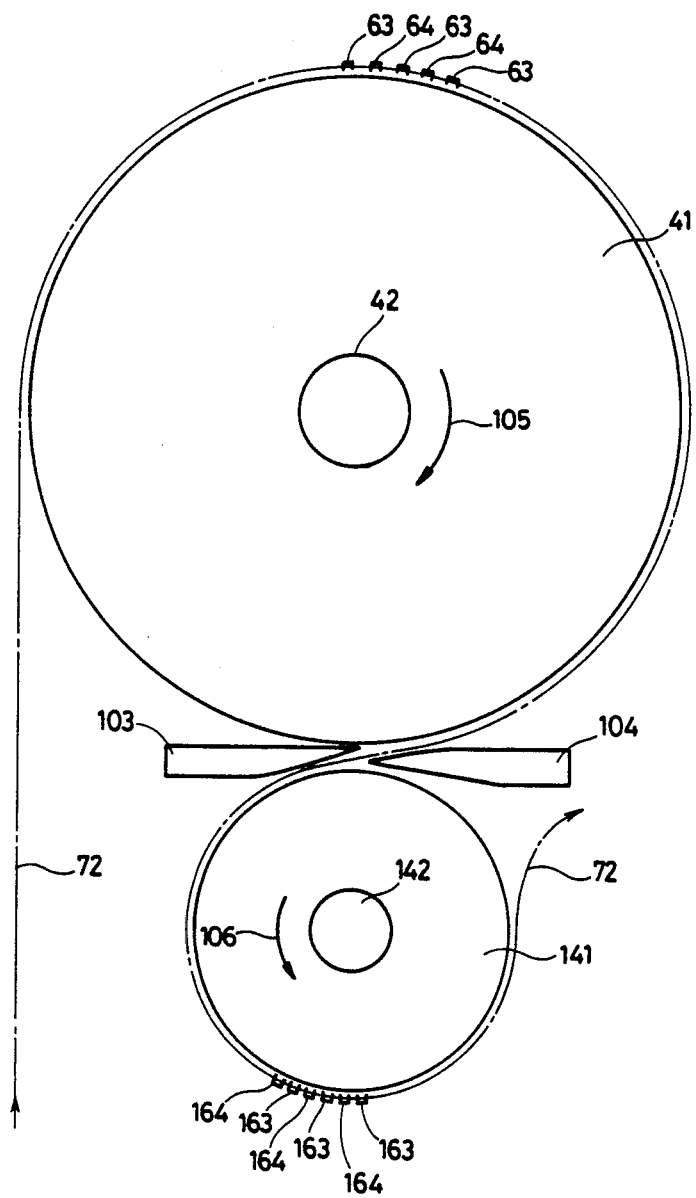
FIG. 18 is a schematic view taken endwise, showing the arrangement of two rotary bodies included in the forming apparatus of FIG. 17.

The forming apparatus shown in FIGS. 17 and 18 includes the forming apparatus of FIG. 14 as such, as is clear from a comparative inspection of reference numerals, and has the following arrangement added thereto.

Referring to FIG. 17, disposed parallel to the first rotary body 41 is a second rotary body 141. A second drive shaft 142 is fixed to the central portion of the second rotary body 141. The second drive shaft 142 is disposed parallel to the first drive shaft 42 and is rotatably held in a bearing 143 attached to the fixed wall 65. In this embodiment, the first and second drive shafts 42 and 142 are respectively provided with first and second gears 101 and 102 meshing with each other, so as to make it possible to transmit rotation to both of the first and second drive shafts 42 and 142 while using a common drive source 44. As a result of the gears 101 and 102 meshing with each other, the second drive shaft 142 is rotated in a direction opposite to the direction of rotation of the first drive shaft 42. In addition, the rotative ratio between the first and second drive shafts 42 and 142 is determined in connection with the respective pitches of pluralities of pins 63, 64 and 163, 164 arranged along outer peripheral surfaces of the rotary bodies 41 and 141. That is, it is so determined that the number of pins 63 and 64 passing through a predetermined position per unit time as the first rotary body 41 rotates is equal to the number of pins 163 and 164 passing through a predetermined position per unit time as the second rotary 141 body rotates.

As the means for transmitting rotation from the first drive shaft 42 to the second drive shaft 142, belts or pulleys may be used instead of said gears 101 and 102.

As will be understood by referring to FIG. 17, the arrangement associated with the first rotary body 41 is the same as that associated with the second rotary body 141. Therefore, the repetition of the same description is avoided by applying the reference numbers used in describing the arrangement associated with the first rotary body 41, plus 100, to the corresponding portions of the arrangement associated with the second rotary body 141. That is, the arrangement associated with the second rotary body 141 includes third and fourth cam followers 147 and 148 corresponding to the aforesaid first and second cam followers 47 and 48, respectively, and third and fourth cams 168 and 169 adapted to act on them. Further, third pins 163 are held by the third cam followers 147 and fourth pins 164 are held by the fourth cam followers 148.

Referring to FIG. 18, the first and second rotary bodies 41 and 141 are schematically shown as taken endwise. Further, the first and second pins 63 and 64 are schematically shown as arranged, shifted by a half pitch from each other, on the outer periphery of the first rotary body 41. Further schematically shown as arranged on the outer periphery of the second rotary body 141 are the third and fourth pins 163 and 164 shifted by a half pitch from each other. The material lead wire 72, shown in a dash-dot line, is first fed along the outer periphery of the first rotary body 41, as indicated by arrows. And in a region (FIG. 19) where the first and second rotary bodies 41 and 141 are closest to each other, the material lead wire 72 is transferred to the outer periphery of the second rotary body 141; thereafter it is moved along the outer periphery of the second rotary body 141. In addition, to ensure smooth transfer of the material lead wire 72 from the first rotary body 41 to the second rotary body 141, it is preferable to provide guides 103 and 104.

Figure 19:
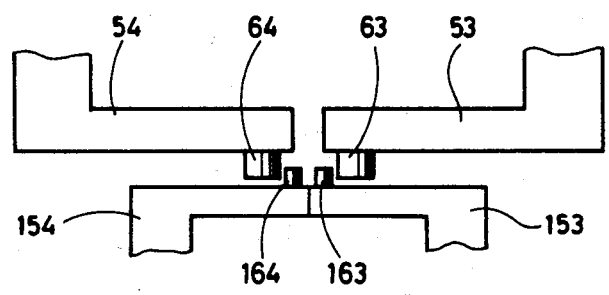
FIG. 19 is an enlarged view showing a region where a pin provided on a first rotary body and a pin provided on a second rotary body shown in FIG. 17 move toward each other to the greatest extent.

While the material lead wire 72 is being moved with the rotation of the first rotary body 41 in the direction of arrow 105, as shown in FIG. 18, a milder sinuous form is imparted thereto. That is, the formation in the first stage is attained. The material lead wire 72 transferred from the first rotary body 41 to the second rotary body 141 in the region shown in FIG. 19 is shaped into the final intended sinuous form as the second rotary body 141 is rotated in the direction of arrow 106.

The manner in which the material lead wire 72 is being sinuously formed using the forming apparatus shown in FIGS. 17 and 18 is sequentially shown in FIGS. 20 through 32. In addition, FIGS. 20 through 31 show, in developed views, the process of transfer of the material lead wire 72 from the first rotary body 41 to the second rotary body 141. In these figures, larger circles indicate the first and second pins 63 and 64 and smaller circles indicate the third and fourth pins 163 and 164. Actually, the third and fourth pins 163 and 164 are smaller in the diameter of their portions acting on the material lead wire 72 than those of the first and second pins 63 and 64.

Figure 20:
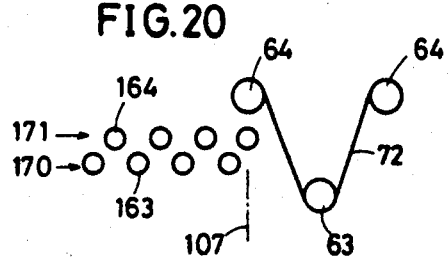
FIGS. 20 through 31 are developed views sequentially illustrating the manner in which a material lead wire is moved from pins held on the first rotary body included in the forming apparatus of FIG. 17 to pins held on the second rotary body.
Figure 24:
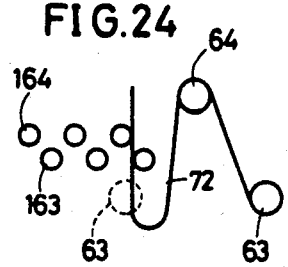
Figure 21:
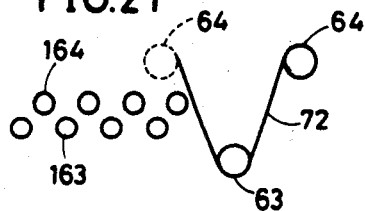
Figure 25:
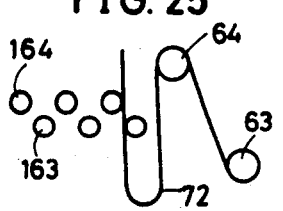
Figure 22:
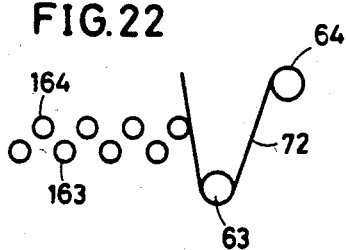
Figure 26:
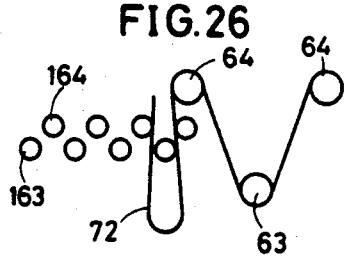
Figure 23:
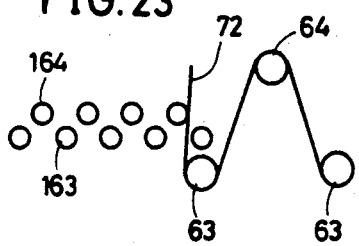
Figure 27:
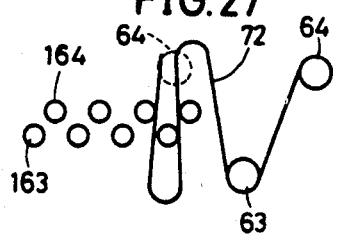
Figure 28:
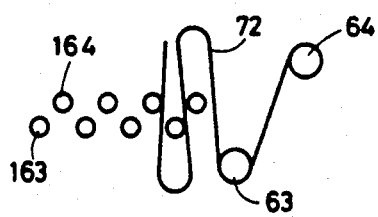
Figure 30:
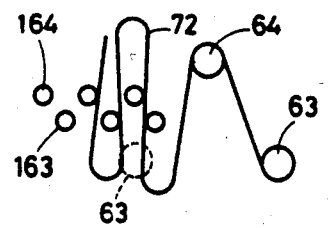
Figure 29:
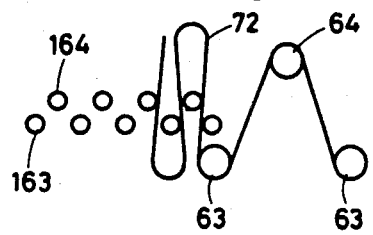
Figure 31:
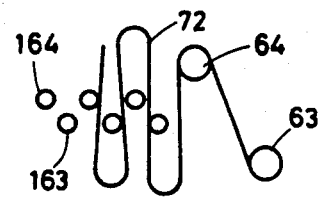

Referring to FIG. 20, the material lead wire 72 is shown as sinuously formed by the first and second pins 63 and 64. The material lead wire 72 has a V-shaped sinuous portion, thus having only a milder sinuous form than the final intended sinuous form. Further, the pitch with which the first and second pins 63 and 64 are arranged is greater than the pitch with which the third and fourth pins 163 and 164 are arranged. By the ratio of these pitches is determined the ratio of the speeds of the outer peripheral surfaces of the first and second rotary bodies 41 and 141. That is, it is so determined that, in FIG. 20, when n first or second pins 63 or 64 pass across a predetermined reference line 107, the same number, n, of third or fourth pins 163 or 164 pass across it.

As shown in FIGS. 20 through 31, the material lead wire 72 transfers from the first and second pins 63 and 64 to the third and fourth pins 163 and 164. The V-shaped portion of the material lead wire 72 is folded so that it is bent in an increasing degree, and it travels as it is carried by the third and fourth pins 163 and 164. In addition, dotted-line circles shown in FIGS. 21, 24, 27 and 30 indicate the first or second pins 63 or 64 which are about to leave the material lead wire 72.

Figure 32:
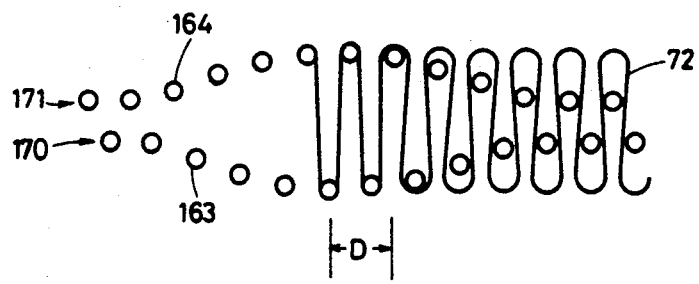
FIG. 32 is a developed view showing the arrangement of the pins held on the second rotary body of FIG. 17 and also showing the manner in which the final formation is being imparted to the material lead wire.

FIG. 32 shows, in a developed view, how the formation of the material lead wire 72 takes place on the second rotary body 141. In FIG. 32, the material lead wire 72 and the third and fourth pins 163 and 164 move from right to left with the rotation of the second rotary body 141. The third pin series 170 composed of the third pins 163 and the fourth pin series 171 composed of the fourth pins 164 travel a path such that they move progressively away from and then toward each other as the rotary body 141 is rotated. Thus, the material lead wire 72 which has already been given a sinuous form is further widthwise spread in the region D by the third and fourth pins 163 and 164 and is plastically deformed to have bent portions extending along the third and fourth pins 163 and 164 of smaller diameter. In this case, if the material lead wire 72 plastically deformed by being pulled beyond its elastic limit, deformation due to spring-back after formation can be prevented.

It follows that the material lead wire 72 having undergone the formation described with reference to FIG. 32 has the final sinuous form.

In addition, in the forming apparatus shown in FIGS. 17 and 18, the second rotary body 141 is preferably arranged for easy exchange. That is, if a number of second rotary bodies associated with the different geometries of sinuous lead wires to be obtained are prepared, some types of sinuous lead wires can be efficiently produced, as desired, by exchanging the second rotary body.

Figure 33:
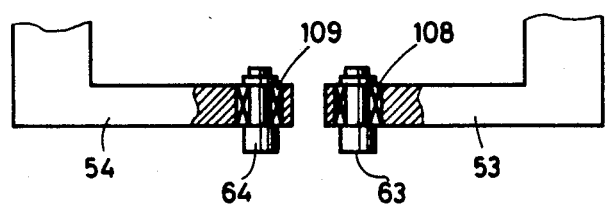
FIG. 33 shows a preferred manner of supporting pins installed in a forming apparatus according to the invention.

FIG. 33 shows a desired manner of attaching the first and second pins 63 and 64 to the support blocks 53 and 54. More particularly, the first and second pins 63 and 64 are rotatably attached to the support blocks 53 and 54 through bearings 108 and 109. This enables the first and second pins 63 and 64 contacted with the material lead wire to rotate in accordance with the lengthwise movement of the material lead wire, thus preventing excessive forces from concentrating in particular locations on the material lead wire.

In addition, the arrangement shown is FIG. 33 is applicable to the pins used in the apparatus shown in FIGS. 4 and 5, the apparatus shown in FIG. 10, the apparatus shown in FIG. 14, the apparatus shown in FIG. 15 and the apparatus shown in FIG. 17. Particularly in the apparatus shown in FIG. 17, it is applicable to the third and fourth pins 163 and 164. However, in the case of the apparatus of FIG. 17, since the material lead wire has been given in advance a sinuous form by the first and second pins 63 and 64 and since the third and fourth pins 163 and 164 continue to contact fixed portions of the material lead wire while they are in action, the arrangement of FIG. 33 may be applied only to the first and second pins 63 and 64.

Figure 34:
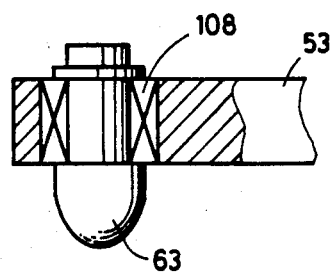
FIG. 34 shows a preferred form of pin installed in a forming apparatus according to the invention.

FIG. 34 shows a preferred form of first pin 63. In FIG. 34, too, the pin 63 is rotatably held by the support block 53 through a bearing 108. The pin 63 is made in the form of a cone or sphere so that its front end is thin. The pin 63 in the form shown in FIG. 34 is capable of smoothly receiving and releasing the material lead wire. Thus, the arrangement shown in FIG. 34 is advantageous particularly when applied to the first through fourth pins 63, 64, 163 and 164 in the forming apparatus shown in FIG. 17.

Figure 35:
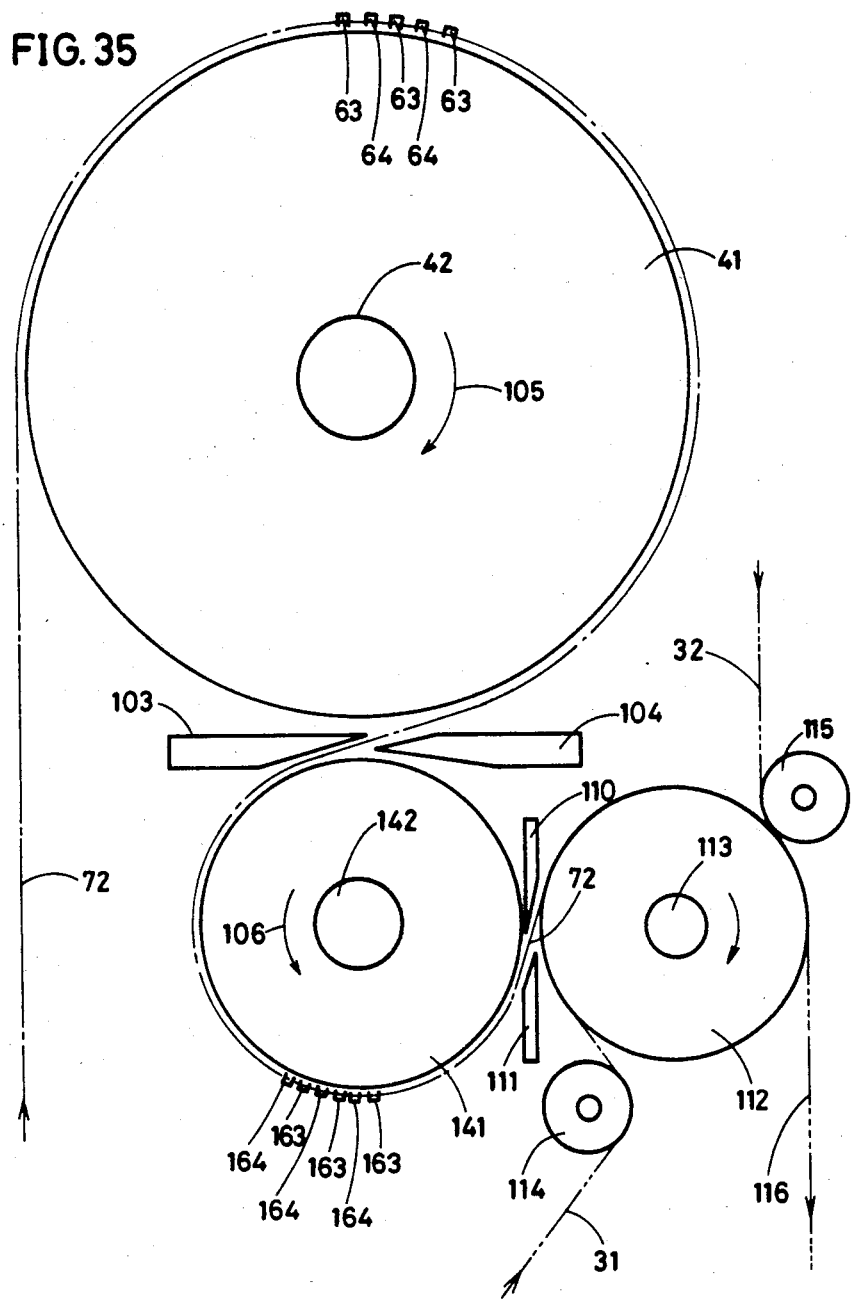
FIG. 35 schematically shows a taping device incorporated in the forming apparatus of FIG. 17 so that the sinuous lead wire 72 formed by the forming apparatus of FIG. 17 is fixed on a holder 31 in the form of a strip of cardboard by means of an adhesive tape 32.

FIG. 35 schematically shows a taping device incorporated in the forming apparatus of FIG. 17 so that the sinuous lead wire 72 formed by the forming apparatus of FIG. 17 is fixed on a holder 31 in the form of a strip of cardboard by means of an adhesive tape 32. In FIG. 35, the sinuous lead wire 72 taken out of the second rotary body 141 is transferred to a third rotary body 112 through guides 110 and 111. The third rotary body 112 is driven by a drive shaft 113 synchronously with the second rotary body 141 and in a direction opposite to that of the latter and is supplied at its outer peripheral surface with the strip-like holder 31 through a roller 114. Thus, the sinuous lead wire 72 ultimately transferred onto the holder 31. The sinuous lead wire 72 transferred onto the holder 31 is fixed on the latter in that the strip-like adhesive tape 32 is stuck to the holder 31 by a press roller 115. As a result, a sinuous lead wire 116 which is taped, like the one shown in FIG. 6, is continuously taken out from the outlet side of the third rotary body 112. Such taping device may also be incorporated in the forming apparatuses shown in FIGS. 10, 14 and 15, respectively.

So far, the invention has been described in connection with the illustrated embodiments thereof, but some modifications thereof are possible.

For example, in the forming apparatus shown in FIG. 10, the first and second pins 63 and 64 have been shown as independently movable, but two or more pins may be supported on a common support body and thereby moved as a unit.

Further, the first and second pins 63 and 64 or the third and fourth pins 163 and 164 which are paired have been shown as having active portions of the same diameter, but they may have active portions of different diameters.

Further, the pins 63, 64, 163 and 164 have been shown as having active portions which are circular in cross-section, but other cross-sectional shapes may be employed. That is, the pins used in this invention may have any shape provided that the shape enables them to catch the material lead wire.

Although the present invention has been described and illustrated in detail in connection with embodiments thereof, it is clearly understood that the same is by way of illustration and example only and is not to be taken by way of limitation, the scope of the present invention being limited only by the terms of the appended claims.

What is claimed is:

1. An apparatus for forming a sinuous lead wire, comprising:
 a first pin series composed of a plurality of first pins arranged with an equal pitch,
 a second pin series composed of a plurality of second pins arranged with an equal pitch to form a row extending along said first pin series, said second pin series being shifted by a half pitch from said first pin series, and
 pin drive means for relatively moving the first and second pins in a direction substantially at right angles to the direction in which the first and second pin series extend, with a material lead wire disposed between said first and second pin series to extend in the direction in which the pin series extend, in such a manner that each said first pin enters between corresponding ones of said second pins;
 a third pin series composed of a plurality of third pins arranged with a pitch which is smaller than that of the first and second pins, and
 a fourth pin series composed of a plurality of fourth pins arranged with an equal pitch which is the same as that of said third pins to form a row extending along said third pin series and shifted by a half pitch from said third pin series, wherein
 said first and second pin series are arranged in two rows circumferentially on the outer periphery of a first rotary body driven for rotation, and the pins included in at least one of said first and second pin series are moved independently of each other to enter between mating pins,
 said third and fourth pin series are arranged in two rows circumferentially on the outer periphery of a second rotary body rotated in a direction opposite to the direction of rotation of the first rotary body by a second rotary shaft parallel to said first rotary body, and the pins included in at least one of said third and fourth pin series are movable independently of each other so that the distance between each pin and its mating pin can be changed,
 said pin drive means drives the third and fourth pins to relatively move them in a direction substantially at right angles to the direction in which the pin series extend, in such a manner that the distance between each third pin and its mating fourth pin can be changed, and a material lead wire is continuously transferred from the outer periphery of said first rotary body to the outer periphery of said second rotary body.

2. An apparatus for forming a sinuous lead wire as set forth in claim 1, wherein said first and second pin series are supported on first and second support bodies (25, 26) and said pin drive means imparts movement to at least one of said first and second support bodies.

3. An apparatus for forming a sinuous lead wire as set forth in claim 1, wherein said first and second pin series (70, 71) are arranged in two rows circumferentially on the outer periphery of a rotary body (41) adapted to be driven for rotation, and the pins (63, 64) included in at least one of said first and second pin series are movable independently of each other so as to enter between mating pins.

4. An apparatus for forming a sinuous lead wire as set forth in claim 3, wherein:

said first and second pins are movable independently of each other to enter between mating pins, and said pin drive means comprises:

cylindrical first and second cam means (68, 69) fixedly installed and having first and second cam surfaces (66, 67) opposed to an end surface of said rotary body, and first and second cam followers (47, 48) individually supporting said first and second pins (63, 64) and adapted to be acted upon by said first and second cam surfaces to move corresponding pins along the contours of said first and second cam surfaces.

5. An apparatus for forming a sinuous lead wire as set forth in claim 4, wherein at least one (68) of said first and second cam means is installed so that its position can be adjusted in the direction in which the rotary shaft (42) of said rotary body extends.

6. An apparatus for forming a sinuous lead wire as set forth in claim 1, wherein said pin drive means comprises:

cylindrical cam means (68, 69) fixedly installed and having cam surfaces (66, 67) opposed to an end surface of said rotary body, and cam follower means (47, 48) respectively independently supporting said movable pins and adapted to be acted upon by said cam surfaces to move said pins along the contours of said cam surfaces with the rotation of said rotary body.

7. An apparatus for forming a sinuous lead wire as set forth in claim 1, wherein said pin drive means comprises:

cylindrical first and second cam means (68, 69, 168, 169) having first and second cam surfaces (66, 67, 81, 167, 181) opposed to end surfaces of said first and second rotary bodies (41, 141), and first and second cam followers (47, 48, 147, 148) individually supporting said movable pins and adapted to be acted upon by said first and second cam surfaces to move said pins along the contours of said cam surfaces as said rotary bodies are rotated.

8. An apparatus for forming a sinuous lead wire as set forth in claim 1, wherein said first and second pins have active portions of circular cross-section.

9. An apparatus for forming a sinuous lead wire as set forth in claim 8, wherein said first and second pins have their front ends thinned.

10. An apparatus for forming a sinuous lead wire as set forth in claim 8, wherein said first and second pins are rotatable around their respective axes.

11. An apparatus for forming a sinuous lead wire as set forth in claim 8, wherein said first and second pins have active portions which are the same in diameter.

12. An apparatus for forming a sinuous lead wire as set forth in claim 1, wherein said second rotary body is removable from said second rotary shaft.

13. An apparatus for forming a sinuous lead wire as set forth in claim 12, further comprising a third rotary body which is configured to be mounted to said second rotary shaft and to replace said second rotary body, said third rotary body having pin series thereon that replace said third and fourth pin series but have a different pitch.

* * * * *